UNITED STATES PATENT OFFICE.

DWIGHT WARREN, OF WINSTED, CONNECTICUT, ASSIGNOR TO HIMSELF AND WILLIAM H. TAYLOR, OF SAME PLACE.

DISINFECTING COMPOUND.

SPECIFICATION forming part of Letters Patent No. 252,555, dated January 17, 1882.

Application filed July 23, 1881. (No specimens.)

To all whom it may concern:

Be it known that I, DWIGHT WARREN, of Winsted, in the county of Litchfield and State of Connecticut, have invented a new and Improved Disinfecting Compound, of which the following is a specification.

My improved disinfecting compound consists of the following ingredients, combined in about the proportions stated, viz: sulphate of alumina, two and one-half parts, by weight; permanganate of potash, one part, by weight; bichromate of potash, one fourth of one part, by weight. The sulphate of alumina and the permanganate of potash are used as crystals, and the bichromate of potash is finely powdered and thoroughly mixed with the above-named crystals.

This mixture is gradually dissolved and mixed with the contents of the water-closet by means of a device of my invention, and cleanses, disinfects, and deodorizes the contents of the water-closet or urinal in the most perfect manner.

Having thus fully described my invention, I claim as new and desire to secure by Letters Patent—

The herein described disinfecting compound, consisting of sulphate of alumina, permanganate of potash, and bichromate of potash, in the proportions specified.

DWIGHT WARREN.

Witnesses:
ROLLIN H. COOKE,
JULIUS H. WHITING.